United States Patent
Goto

(10) Patent No.: US 10,690,155 B2
(45) Date of Patent: Jun. 23, 2020

(54) ACTUATOR

(71) Applicant: KABUSHIKI KAISHA TOSHIBA, Minato-ku (JP)

(72) Inventor: Tatsuhiko Goto, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/277,134

(22) Filed: Feb. 15, 2019

(65) Prior Publication Data

US 2020/0072251 A1    Mar. 5, 2020

(30) Foreign Application Priority Data

Aug. 28, 2018 (JP) .................. 2018-159446

(51) Int. Cl.
| | | |
|---|---|---|
| *F15B 15/10* | (2006.01) | |
| *B25J 9/14* | (2006.01) | |
| *F15B 15/02* | (2006.01) | |
| *B25J 9/10* | (2006.01) | |

(52) U.S. Cl.
CPC ............. *F15B 15/103* (2013.01); *B25J 9/142* (2013.01); *F15B 15/02* (2013.01); *B25J 9/1075* (2013.01); *F15B 2215/30* (2013.01)

(58) Field of Classification Search
CPC .......... F15B 15/103; B25J 9/142; F01B 19/04
USPC ...................................... 92/37, 39
See application file for complete search history.

(56) References Cited

U.S. PATENT DOCUMENTS

| | | | | |
|---|---|---|---|---|
| 4,751,868 A | * | 6/1988 | Paynter | .................... B23Q 1/34 901/22 |
| 4,841,843 A | * | 6/1989 | Shishkin | ................. F15B 15/08 91/459 |
| 2017/0328381 A1 | | 11/2017 | Goto et al. | |
| 2017/0328384 A1 | | 11/2017 | Goto et al. | |
| 2018/0058480 A1 | | 3/2018 | Asai et al. | |
| 2019/0085877 A1 | | 3/2019 | Goto et al. | |

FOREIGN PATENT DOCUMENTS

| | | | | |
|---|---|---|---|---|
| DE | 102009008128 A1 | * | 8/2010 | .............. F15B 15/10 |
| JP | 2012-125847 | | 7/2012 | |
| JP | 2013-148204 | | 8/2013 | |
| JP | 2014-061327 | | 4/2014 | |
| JP | 2014-155996 | | 8/2014 | |
| JP | 2017-203529 | | 11/2017 | |

(Continued)

OTHER PUBLICATIONS

DE 102009008128 machine translation to English from espacenet. (Year: 2010).*

*Primary Examiner* — F Daniel Lopez
*Assistant Examiner* — Michael Quandt
(74) *Attorney, Agent, or Firm* — Oblon, McClelland, Maier & Neustadt, L.L.P.

(57) ABSTRACT

An actuator includes a base to which first and second fluid couplings are fixed, a rotation member rotatably supported by the base, and McKibben-type first and second artificial muscles wound around the rotation member. The first and second artificial muscles are arranged in an antagonistic manner. One ends of the first and second artificial muscles are fixed to the rotation member. The other ends of the first and second artificial muscles are respectively connected to the first and second fluid couplings.

4 Claims, 8 Drawing Sheets

(56) References Cited

FOREIGN PATENT DOCUMENTS

| | | |
|---|---|---|
| JP | 2017-203535 | 11/2017 |
| JP | 2018-035936 | 3/2018 |
| JP | 2019-52754 A | 4/2019 |
| WO | WO 2017/038836 A1 | 3/2017 |

* cited by examiner

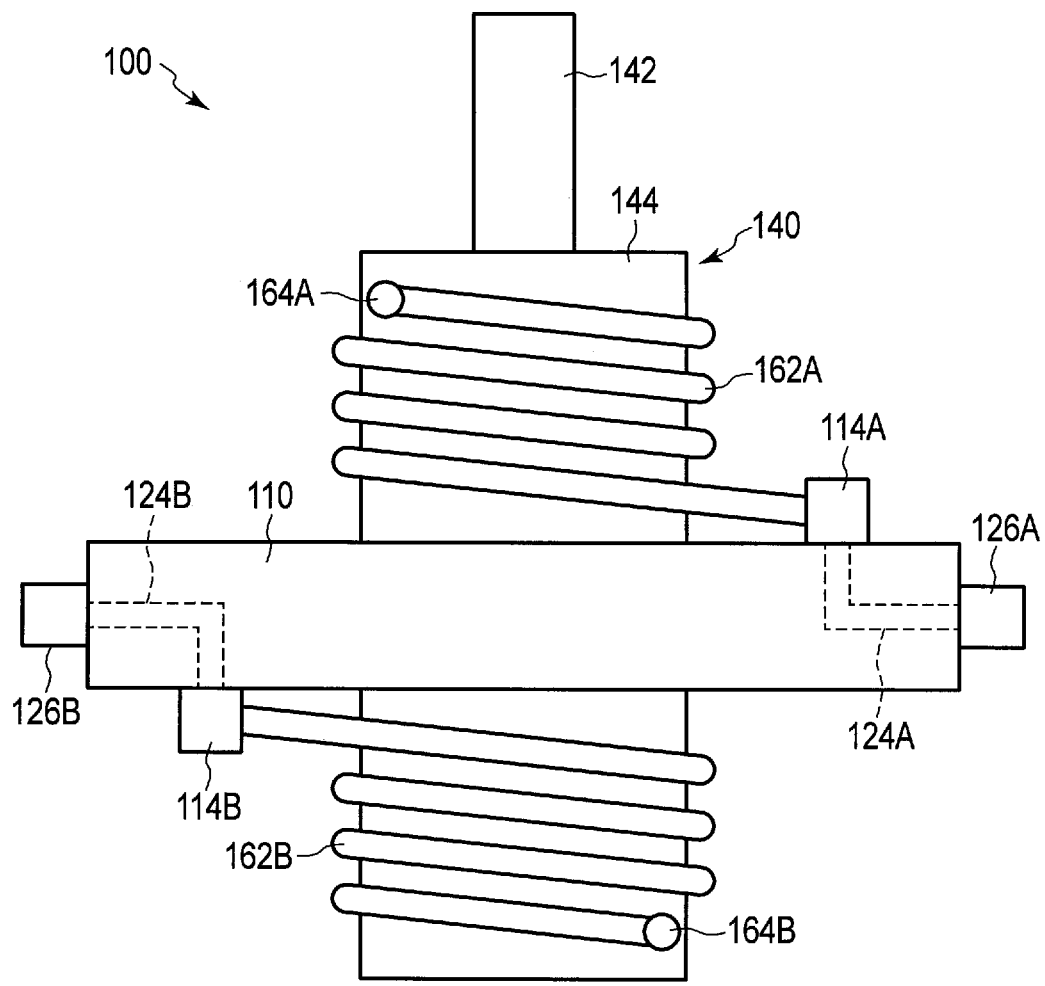
F I G. 1

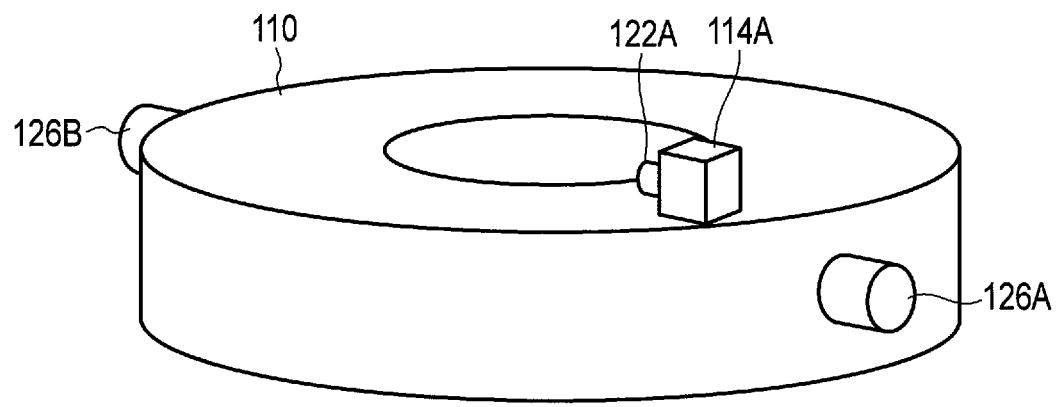
F I G. 3
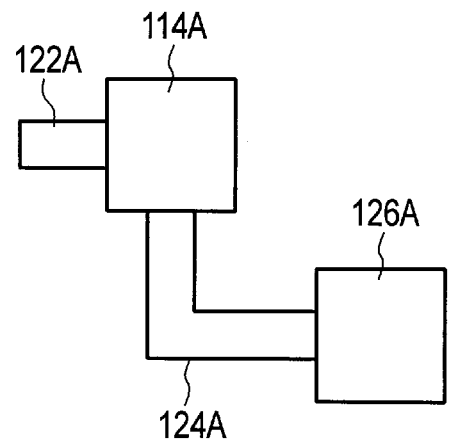
F I G. 4

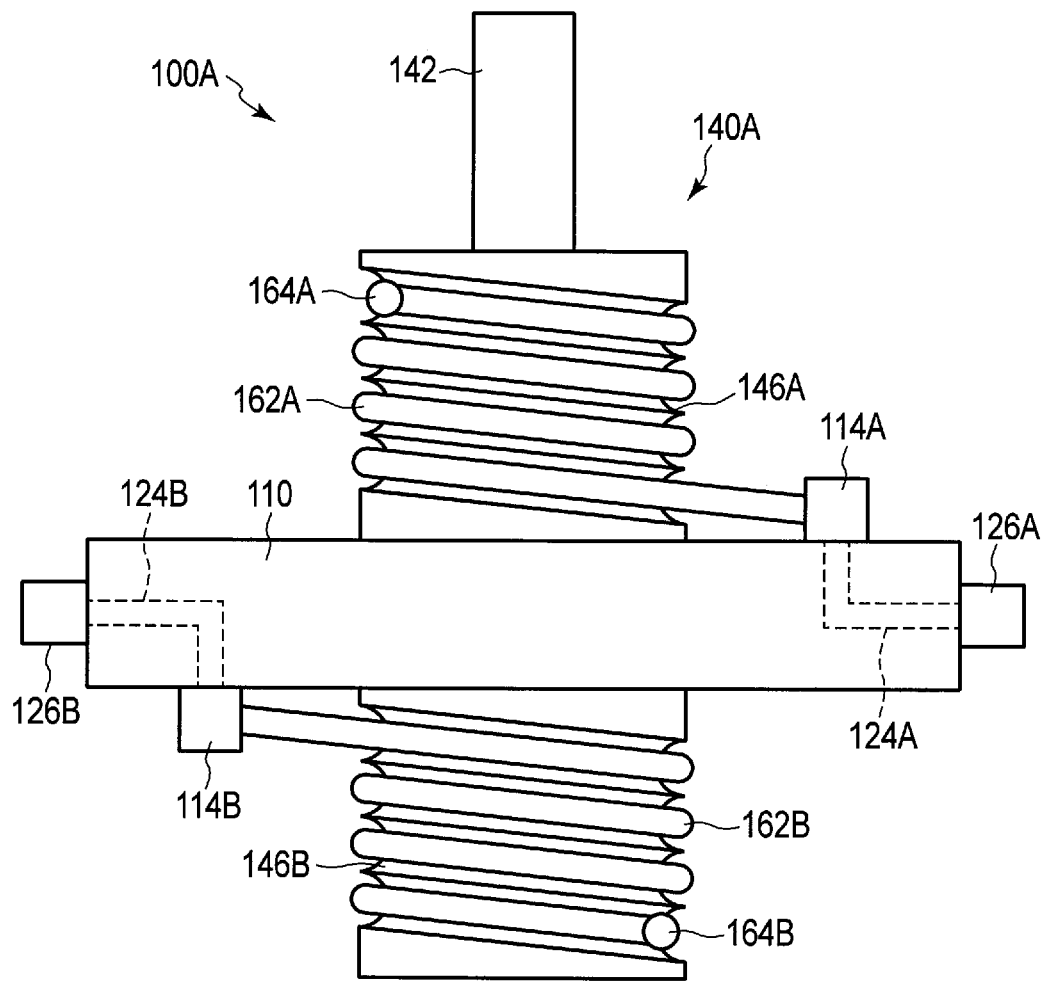
F I G. 5

ACTUATOR

CROSS-REFERENCE TO RELATED APPLICATIONS

This application is based upon and claims the benefit of priority from Japanese Patent Application No. 2018-159446, filed Aug. 28, 2018; the entire contents of which are incorporated herein by reference

FIELD

Embodiments described herein relate generally to an actuator.

BACKGROUND

An actuator that carries out rotation of a flexible joint by using artificial muscles is known. In this actuator, artificial muscles respectively functioning as an agonist muscle and an antagonist muscle are placed in parallel to each other as a pair, and a wire connected to the agonist muscle and a wire connected to the antagonist muscle are wound around a rotation shaft in a mutually-opposing manner and fixed to the shaft. If the contraction force of the agonist muscle is greater than the contraction force of the antagonist muscle, the agonist muscle contracts greater than the antagonist muscle, and the rotation shaft is rotated toward the side where the agonist muscle is attached. If, on the other hand, the contraction force of the antagonist muscle is greater than the contraction force of the agonist muscle, the agonist muscle contracts greater than the agonist muscle, and the rotation shaft is rotated toward the side where the antagonist muscle is attached.

BRIEF DESCRIPTION OF THE DRAWINGS

FIG. 1 is a diagram of an actuator according to an embodiment.

FIG. 3 is a perspective view of a base shown in FIG. 1.

FIG. 4 is a diagram of a fluid flow path shown in FIG. 1.

FIG. 5 is a diagram of the main part of an alternative actuator according to an embodiment.

DETAILED DESCRIPTION

An actuator according to an embodiment includes a base to which first and second fluid couplings are fixed, a rotation member rotatably supported by the base, and McKibben-type first and second artificial muscles wound around the rotation member. The first and second artificial muscles are arranged in an antagonistic manner. One ends of the first and second artificial muscles are fixed to the rotation member. The other ends of the first and second artificial muscles are respectively connected to the first and second fluid couplings.

Figure 2:
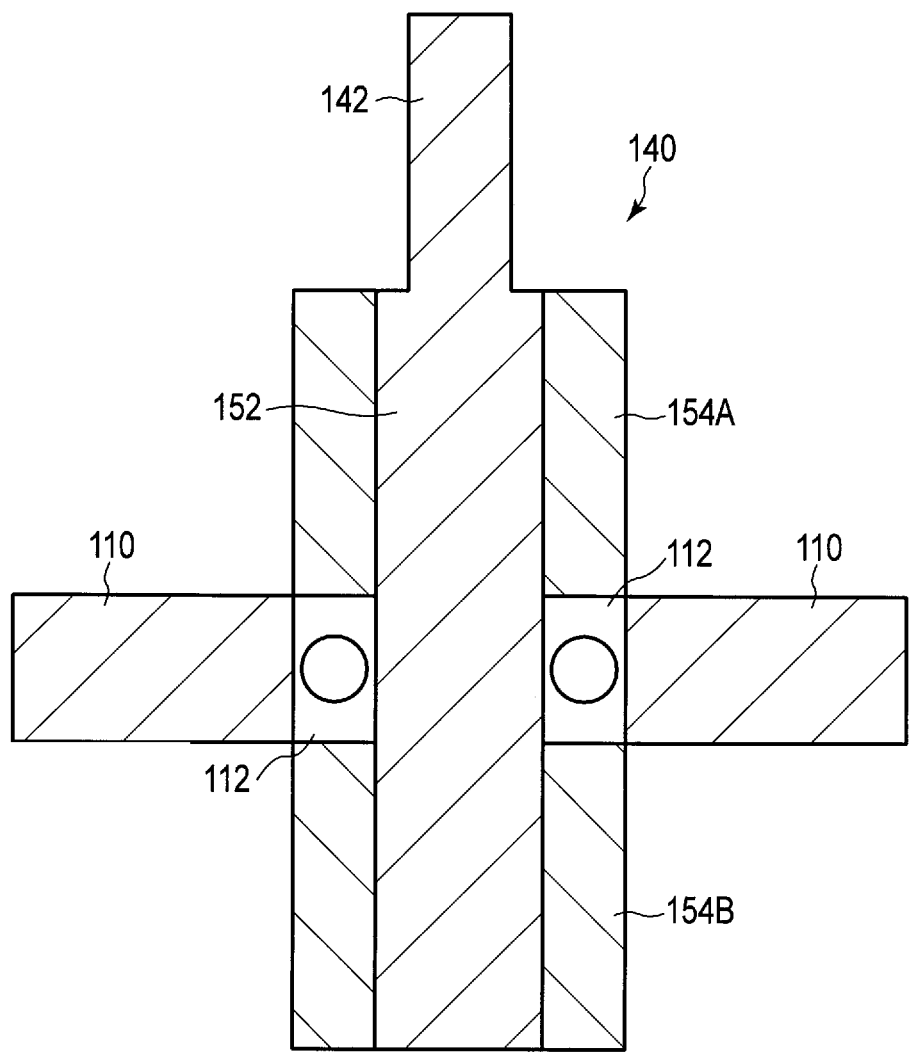
FIG. 2 is a vertical cross-sectional diagram illustrating the actuator shown in FIG. 1.

Embodiments will be described below with reference to the drawings. FIG. 1 is a diagram of an actuator 100 according to an embodiment. FIG. 2 is a vertical cross-sectional diagram illustrating the actuator 100 shown in FIG. 1. FIG. 3 is a perspective view of a base shown in FIG. 1. FIG. 4 is a diagram of a fluid flow path shown in FIG. 3.

The actuator 100 is an actuator for flexible joints. Flexible joints herein refer to joints that have flexibility in joint movements. In other words, although they are fixed at a certain angle, flexible joints can move in response to an external force.

As shown in FIG. 1, the actuator 100 comprises a base 110, a rotation member 140 rotatably supported by the base 110, and a pair of McKibben-type artificial muscles 162A and 162B wound around the rotation member 140.

The base 110 has a shape of a disc in appearance. The rotation member 140 has a main body 144 and a rotation shaft 142 projecting from the main body 144. Both of the main body 144 and the rotation shaft 142 have a shape of a column in appearance.

As shown in FIG. 2, the rotation member 140 is attached to the base 110 with a bearing 112 being interposed therebetween. For example, the rotation member 140 includes a core member 152 having the rotation shaft 142, and a pair of sleeves 154A and 154B placed around the core member 152. The sleeves 154A and 154B are stationarily fixed to the core member 152, sandwiching the bearing 112 therebetween.

The structure of the rotation member 140 shown in FIG. 2 is merely an example, and the structure is not limited thereto. In the example shown in FIG. 2, the diameter of the main body 144 of the rotating member 140 is reduced in the part where the bearing 112 of the base 110 is located; however, the embodiment is not limited to this example, and the main body 144 may have a cylindrical body having a constant diameter.

Each of the McKibben-type artificial muscles 162A and 162B has a tubular structure through which a fluid, for example air, can flow inside, and expands and contracts as a pressure of the fluid flowing inside changes. Specifically, the McKibben-type artificial muscles 162A and 162B contract in an axial direction, thickening in a diameter direction as the pressure of the fluid inside increases. As the pressure of the fluid lowers thereafter, the McKibben-type artificial muscles 162A and 162B extend in an axial direction, thinning in a diameter direction so as to return to their original shapes.

As shown in FIG. 1, the pair of artificial muscles 162A and 162B is arranged in an antagonistic manner. In other words, the artificial muscles 162A and 162B are wound around the main body 144 of the rotation member 140 in mutually-opposite directions. Specifically, the artificial muscle 162A is spirally wound around the rotation member 140 in a first circumferential direction. The artificial muscle 162B is spirally wound around the rotation member 140 in a second circumferential direction that is opposite to the first circumferential direction. Herein, the first circumferential direction and the second circumferential direction are directions along a circumference located on a peripheral surface of the main body 144 of the rotation member 140. For example, as seen from a direction along a central axis, that is, a rotation axis, of the rotation member 140, the first circumferential direction is a clockwise direction, and the second circumferential direction is a counterclockwise direction.

One ends or first ends of the artificial muscles 162A and 162B are respectively fixed to the main body 144 of the rotation member 140 by stoppers 164A and 164B. The other ends or second ends of the artificial muscles 162A and 162B are respectively fixed to the stoppers 114A and 114B, which are fixed to the base 110.

In the present embodiment, the artificial muscles 162A and 162B are spirally wound around the rotation member 140; however, as long as the number of times the artificial muscles 162A and 162B are wound around is less than one, each of the artificial muscles 162A and 162B may be wound around the rotation member 140 on the same circumference.

As shown in FIGS. 1 and 3, the fluid couplings 126A and 126B are fixed to the base 110. As shown in FIG. 1, the fluid couplings 126A and 126B are fluidally connected to the stoppers 114A and 114B through pipe lines 124A and 124B extending inside the base 110, respectively.

For example, as shown in FIG. 4, a fluid coupling 122A is fixed to the stopper 114A, and the fluid coupling 122A is fluidally connected to the fluid coupling 126A through the stopper 114A and the pipe line 124A. The fluid coupling 122A will be fluidally connected to the artificial muscle 162A. The fluid coupling 122A preferably projects in a direction of the tangent line of the rotation member 140 drawn from the stopper 114A so that the artificial muscle 162A is easily wound around the rotation member 140. Although the stopper 114A is representatively described herein, the above description of the stopper 114A is applied to the stopper 114B.

As aforementioned, the artificial muscles 162A and 162B are wound around the main body 144 of the rotation member 140 in mutually-opposite directions. For this reason, the artificial muscles 162A and 162B are in an antagonistic relationship. For example, the artificial muscle 162A acts as an agonist muscle, and the artificial muscle 162B acts as an antagonist muscle. The rotation member 140 is rotated by adjusting a pressure of a fluid, such as air, supplied to the artificial muscles 162A and 162B.

As can be understood from the above description, since the one ends or first ends of the artificial muscles 162A and 162B are fixed to the rotation member 140, and the artificial muscles 162A and 162B are wound around the main body 144 of the rotation member 140, the actuator 100 has a structure suitable for space-saving.

Furthermore, since the rotation member 140 is driven by the artificial muscles 162A and 162B, backlash never occurs, and it is possible to achieve stepless adjustment of the rotation angle of the rotation member 140.

Figure 6:
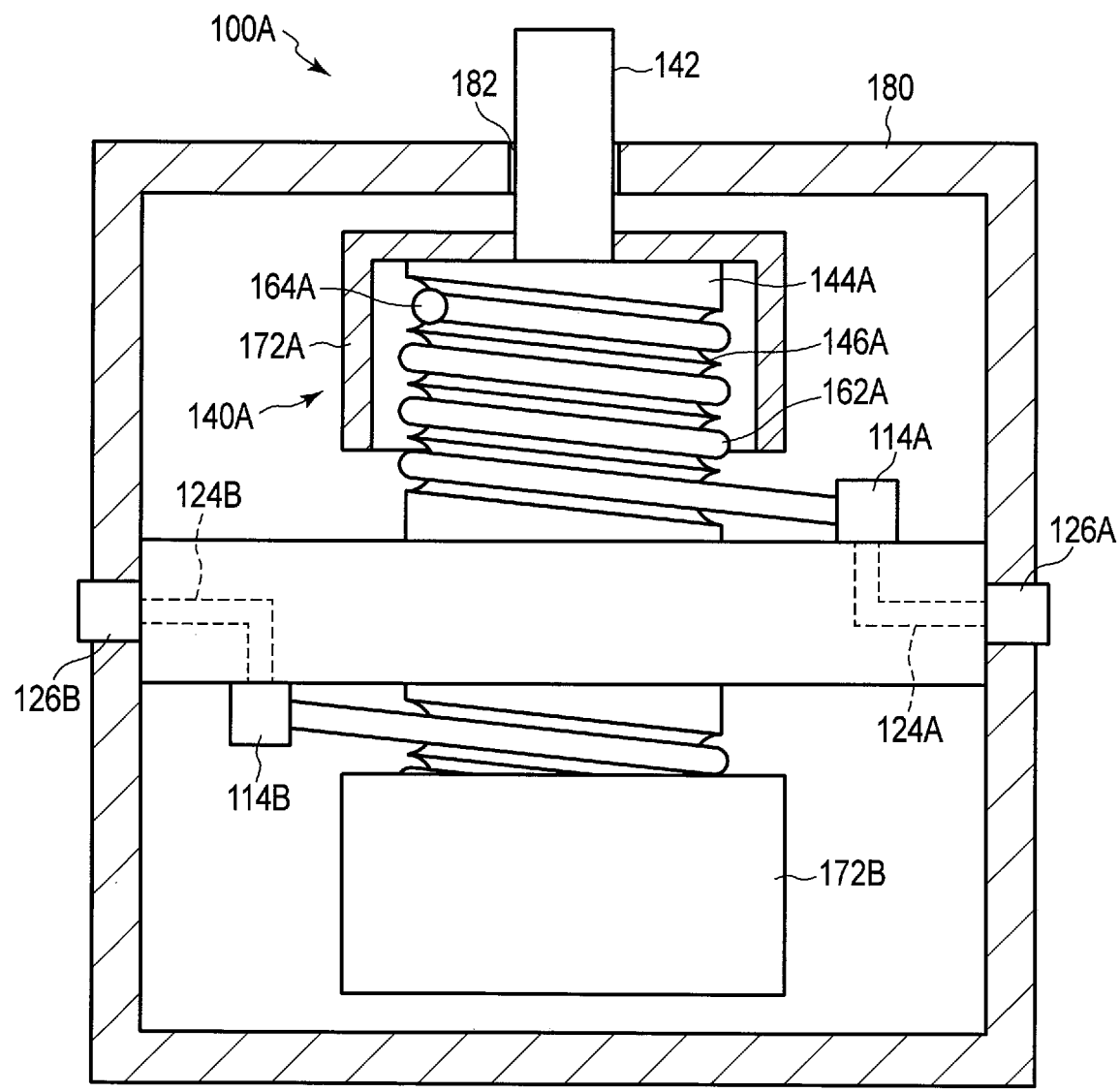
FIG. 6 is an overall diagram of the alternative actuator according to the embodiment.

FIG. 5 is a diagram of the main part of an alternative actuator 100A according to an embodiment. FIG. 6 is an overall diagram of the actuator 100A according to the embodiment. In these diagrams, elements denoted by the same reference symbols as in FIG. 1 are the same as those in FIG. 1, and redundant descriptions of such elements will be omitted. Mainly the differences between the actuator 100 and the actuator 100A will be described. In other words, the elements not described below are the same as the elements of the actuator 100.

In the actuator 100A, as shown in FIG. 5, the rotation member 140A has grooves, for example spiral grooves 146A and 146B, configured to receive the artificial muscles 162A and 162B, respectively. The spiral groove 146A (146B) has a width equal to or greater than a maximum diameter of the artificial muscle 162A (162B). Herein, a maximum diameter of the artificial muscle 162A (162B) is a diameter of when a pressure of a fluid is at maximum in a normal use state.

In the present embodiment, the grooves configured to respectively receive the artificial muscles 162A and 162B are the spiral grooves 146A and 146B; however, as long as the number of times the artificial muscles 162A and 162B are wound around is less than one, the grooves may be grooves that each goes around the circumference of the rotation member 140A once.

Since the artificial muscles 162A and 162B are received by the spiral grooves 146A and 146B respectively, the artificial muscles 162A and 162B are wound around the rotation member 140A with stability. Specifically, each of the artificial muscles 162A and 162B is wound at a constant pitch around the rotation member 140A.

Since a width of the spiral groove 146A (146B) is equal to or greater than a maximum diameter of the artificial muscle 162A (162B), the artificial muscle 162A (162B) can thicken up to its maximum diameter without interference from its own neighboring wound portions.

As shown in FIG. 6, the actuator 100A further comprises covers 172A and 172B attached to the rotation member 140A. For example, the covers 172A and 172B are fixed to the top surface and the bottom surface of the main body 144A of the rotation member 140A, respectively. Each of the covers 172A and 172B has a closed-cylindrical shape. The cylindrical cover 172A has, in the bottom, a through-hole through which the rotation shaft 142 passes.

The cover 172A and 172B cooperate with the rotation member 140A to form spaces for storing the artificial muscles 162A and 162B, respectively. A gap between the spiral groove 146A (146B) and the cover 172A (172B) is equal to or greater than a maximum diameter of the artificial muscle 162A (162B).

A shortest distance from the cover 172A (172B) to the rotation member 140A is shorter than a minimum diameter of the artificial muscle 162A (162B). Herein, a minimum diameter of the artificial muscle 162A (162B) is a diameter of the artificial muscle 162A (162B) when no pressure is applied thereto.

Since the covers 172A and 172B are attached to the rotation member 140A, it is prevented that, when the pressure of the fluid is low, the artificial muscles 162A and 162B slacken, so as to undesirably float from the rotation member 140A.

Since the gap between the cover 172A (172B) and the spiral groove 146A (146B) is equal to or greater than a maximum diameter of the artificial muscle 162A (162B), the artificial muscle 162A (162B) can thicken up to its maximum diameter, without being interfered with by the cover 172A (172B).

Since a shortest distance from the cover 172A (172B) to the rotation member 140A is shorter than a minimum diameter of the artificial muscle 162A (162B), the artificial muscle 162A (162B) is prevented from undesirably disengaging from the spiral groove 146A (146B).

As shown in FIG. 6, the actuator 100A further comprises a case 180 for storing the base 110, a main body 144A of the rotation member 140A, and covers 172A and 172B. The case 180 has a through-hole through which the rotation shaft 142 passes, and a bearing 182 is provided between the rotation shaft 142 and the case 180. The case 180 has through-holes to allow the fluid couplings 126A and 126B to be exposed. The case 180 has a cylindrical shape in appearance, for example.

In the configuration example shown in FIG. 6, the case 180 stores the entire base 110; however, the case 180 may be configured to store a part of the base 110. For example, the case 180 may be comprised of two members respectively fixed to the top surface and the bottom surface of the base 110.

Since the case 180 surrounds the actuator 100A, except for the rotation shaft 142 and the fluid couplings 126A and 126B, the case 180 facilitates attachability of the actuator 100A.

A principle of rotation of the actuators 100 and 100A will be described below.

Suppose the pressure applied to an agonist muscle, for example the artificial muscle 162A, is P1, and the pressure applied to an antagonist muscle, for example the artificial muscle 162B, is P2. The relationship between the rotation angle θ of the rotation shaft 142 and the applied pressures is expressed as shown below based on an equilibrium of forces:

$$\theta = \{(L-C2)/R\} \cdot (P1-P2)/(P1+P2) \quad (1).$$

Herein, R represents a radius of the rotation member 140 (140A), C2 represents a constant determined by characteristics of the artificial muscle 162A (162B), and L represents an installed length of the artificial muscle 162A (162B) between the stopper 114A (114B) of the base 110 and the stopper 164A (164B) on the rotation member 140 (140A) when the rotation angle is at a neutral angle (θ=0).

From equation (1), it is possible to change the rotation angle θ in the range of $-(2\alpha) \cdot \{(L-C2)/R\}$ to $(2\alpha) \cdot \{(L-C2)/R\}$ rad by changing the ratio of applied pressures, $(0.5-\alpha) < \{P1/(P1+P2)\} < (0.5+\alpha)$. Herein, α is an adjustment width of an applied pressure.

Since equation (1) can be approximated as the following equation (2), in a case where an amount of the rotation angle is large, the natural length L0 should be long enough:

$$\theta = \{(L-L0/2)/R\} \cdot (P1-P2)/(P1+P2) \quad (2).$$

Herein, the natural length L0 of the artificial muscle is determined so as to satisfy L0>L, more specifically, so as to be equal to or greater than $\{2/(2-\varepsilon max)\}L$. Herein, ε represents a contraction factor and is expressed as (L0−1)/L0.

Figure 7:
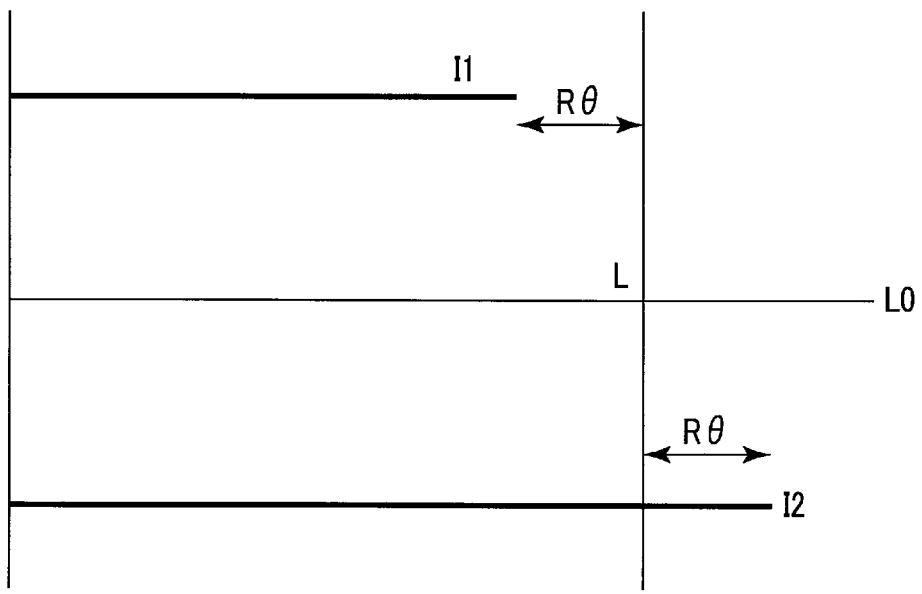
FIG. 7 is a diagram showing the relationship among a length l1 of an agonist muscle, a length l2 of an antagonist muscle, a natural length L0 of the agonist or antagonist muscle, and an attachment length L of the agonist or antagonist muscle in the actuator shown in FIGS. 1 to 6.

FIG. 7 shows the relationship among the muscle length l1 of an agonist muscle, for example the artificial muscle 162A, the muscle length l2 of an antagonist muscle, for example the artificial muscle 162B, a natural length L0 of an agonist or antagonist muscle, for example the artificial muscle 162A or 162B, and the installed length L of the agonist or antagonist muscle, for example the artificial muscle 162A or 162B. As the muscle length l1 of the agonist muscle is reduced by Rθ, the muscle length l2 of the antagonist muscle is conversely increased by Rθ.

Since the rotation shaft rotates for degrees of 2π·εmax at maximum in one winding if a maximum contraction factor of the artificial muscles 162A and 162B is max, suppose that a maximum rotation angle is θmax, the number of times (n) the artificial muscle is wound in relation to an amount of rotation is at least equal to or greater than a value calculated by the following equation (3):

$$n = \theta\,max/(2\pi \cdot \varepsilon\,max) \quad (3).$$

In this case, the installed length L of the artificial muscle 162A (162B) is L=d+2πRn. Herein, d represents a distance from the stopper 114A (114B) to the rotation member 140 or 140A. From equation (3), it is understood that it is necessary to increase the number of times (n) the artificial muscle is wound when a larger amount of rotation is required.

Next, joint rigidity will be explained. A torque τ generated when the force balancing angle is changed by degrees of δθ is approximated as expressed by the following equation (4):

$$\tau \approx -(P1+P2) \cdot C3 \cdot R^2 \cdot (d0^2/L0) \cdot \delta\theta = ka \cdot \delta\theta \quad (4).$$

Herein, d0 represents a diameter of the artificial muscle 162A (162B) when no pressure is applied, ka represents joint rigidity, and C3 represents a parameter unique to the artificial muscle 162A (162B) and is expressed as $C3=3\pi/\{2(\tan\theta 0)^2\}$. θ0 represents a winding angle of the artificial muscle 162A (162B).

Accordingly, the joint rigidity ka is changed by adjusting a sum of applied pressures Pa=(P1+P2).

From equation (4), it is understood that, in order to increase the joint rigidity ka, a diameter of the artificial muscle 162A (162B) is required to be greater. In this case, however, since a bent radius of the artificial muscle 162A (162B) becomes larger, the radius R of the rotation member 140 (140A) is required to be larger.

A design procedure of the actuators 100 and 100A will be described below.

In a case of using the rotating member 140 or 140A having a radius R, the number of times (n) the artificial muscle 162A (162B) is wound around the rotation member 140 or 140A, the natural length L0 of the artificial muscle 162A (162B), the installed length L of the artificial muscle 162A (162B), and the muscle diameter d0 of the artificial muscle 162A (162B) when no pressure is applied, will be described below. Herein, suppose a maximum contraction factor of the artificial muscle 162A (162B) to be used is εmax, a maximum value of the sum of applied pressures is (Pa)max, a maximum value of the rotation angle is θmax, and a maximum value of the joint rigidity is (ka)max.

From equation (3), the number of times (n) the artificial muscle is wound around the rotation member is n>θmax/(2π·εmax). The installed length L of the artificial muscles 162A and 162B is L=d+2πRn, and the natural length L0 of the artificial muscle 162A (162B) is determined so as to satisfy L0>{2/(2−εmax)}·L.

From equation (4), the muscle diameter d0 of the artificial muscle 162A (162B) when no pressure is applied is $d0=\{(ka)max \cdot L0/((Pa)max \cdot C3 \cdot R^2)\}^{1/2}$. In reality, a muscle diameter available and approximate to the above value is chosen.

DESIGN EXAMPLES (1) When R=0.03 m, θmax=3π/4, (ka)max=0.05 Nm/rad, (Pa)max=0.5 mpa, and εmax=0.15, since the number of winding times is determined as n=3 because n>2.5.

The installed length L of the artificial muscles 162A and 162B is L=d+2πRn=0.61 if d=1.5R, and the natural length L0 of the artificial muscle 162A (162B) is determined as L0=0.7 because L0>(2/(2−εmax))L=0.66.

The muscle diameter d0 of the artificial muscles 162A and 162B when no pressure is applied is $d0=\{(ka)max \cdot L0/((Pa)max \cdot C3 \cdot R^2)\}^{1/2}=0.0042$ if C3=4.5, so that the artificial muscle 162A (162B) having a diameter of 4 mm should be used.

(2) When R=0.015, θmax=3π/4, (ka)max=0.05 Nm/rad, (Pa)max=0.5 mpa, and εmax=0.15, the number of winding times is determined as n=3 because n>2.5.

The installed length L of the artificial muscles 162A and 162B is L=d+2πRn=0.305 if d=1.5R, and the natural length L0 of the artificial muscles 162A and 162B is determined as L0=0.35 because L0>(2/(2−εmax))L=0.33.

The muscle diameter d0 of the artificial muscles 162A and 162B when no pressure is applied is $d0=\{(ka)max \cdot L0/((Pa)max \cdot C3 \cdot R^2)\}^{1/2}=0.0057$ if C3=4.5, so that the artificial muscles 162A (162B) having a diameter of 6 mm should be used.

Figure 8:
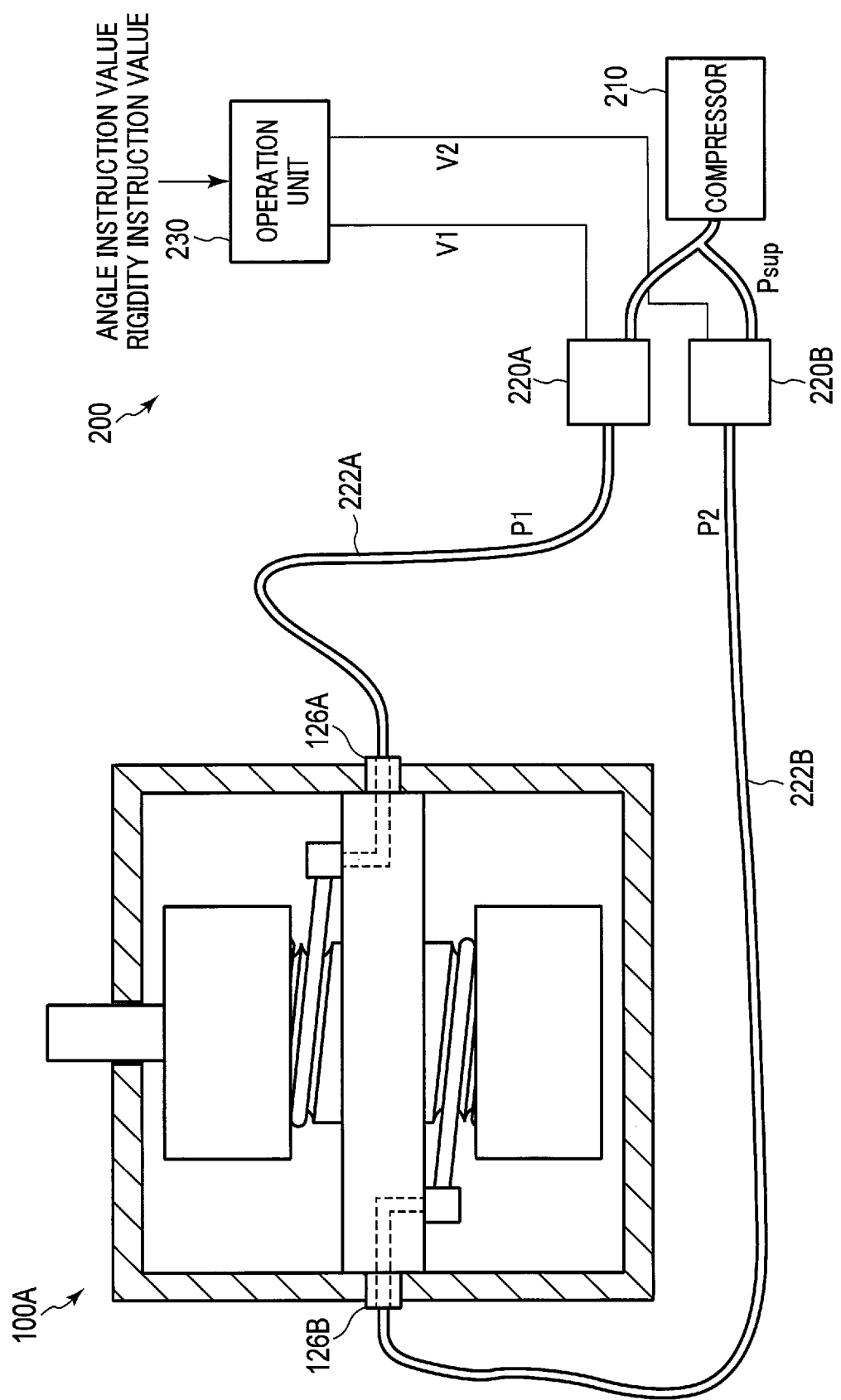
FIG. 8 is a diagram of a pressure adjusting mechanism of artificial muscles for driving the actuator shown in FIG. 6.

FIG. 8 shows a pressure adjusting mechanism 200 of the artificial muscles 162A and 162B for driving the actuator 100A. The pressure adjusting mechanism 200 comprises a compressor 210, pressure proportional electromagnetic valves 220A and 2203, and an operation unit 230.

The compressor 210 is fluidly connected to the pressure proportional electromagnetic valves 220A and 220B through a tube 212. Each of the pressure proportional electromagnetic valves 220A and 220B includes a regulator configured to adjust pressures. The pressure proportional electromagnetic valves 220A and 220B are fluidly connected to the fluid couplings 126A and 126B through tubes 222A and 222B, respectively.

The compressor 210 supplies a pressure Psup, using a fluid, such as air, as a medium. The pressure Psup supplied from the compressor 210 is supplied to the pressure proportional electromagnetic valves 220A and 220B through a filter (not shown) and a decompression valve (not shown).

The operation unit 230 calculates instruction voltages V1 and V2 to be respectively supplied to the pressure proportional electromagnetic valves 220A and 220B, based on an angle instruction value and a rigidity instruction value. The operation unit 230 outputs the calculated instruction voltages V1 and V2 respectively to the pressure proportional electromagnetic valves 220A and 220B, through a D/A converter or a pulse width modulator, for example.

The pressure proportional electromagnetic valves 220A and 220B adjust and output the pressure Psup supplied from the compressor 210 in accordance with the input instruction voltages V1 and V2, respectively. The output voltages P1 and P2 provided from the pressure proportional electromagnetic valves 220A and 220B are in a proportional relationship with the input instruction voltages V1 and V2, respectively.

The operation unit 230 calculates the instruction voltages V1 and V2 corresponding to the output pressures P1 and P2 of the pressure proportional electromagnetic valves 220A and 220B, based on the angle instruction value $\theta$ref and the rigidity instruction value (Ka)ref. Specifically, from equation (1), $\theta\text{ref}=\{2(L-C2)/R\}\cdot\{P1/(P1+P2)-\frac{1}{2}\}$. Herein, if $2(L-C2)/R=C4$, $\theta\text{ref}=C4\{P1/(P1+P2)-\frac{1}{2}\}$, and $x=P1/(P1+P2)=\theta\text{ref}/C4+\frac{1}{2}$. Furthermore, from equation (4), $y=(P1+P2)=(Ka)\text{ref}/(C3\cdot R^2\cdot d0^2/L0)=(Ka)\text{ref}/C5$. Therefore, $P1=xy$ and $P2=y(1-x)$ are obtained. The instruction voltages V1 and V2 are calculated from the output pressures P1 and P2 and the characteristics of the pressure proportional electromagnetic valves 220A and 220B.

It may be configured that an encoder or a potentiometer is attached to the rotation shaft 142, the rotation angle $\theta$ of the rotation shaft 142 is fed back to the operation unit 230, and the instruction voltages V1 and V2 are determined.

FIG. 8 shows an example in which a single actuator 100A is driven, but if actuators 100 (100A) are driven, the compressor 210 may be shared by the actuators.

Figure 9:
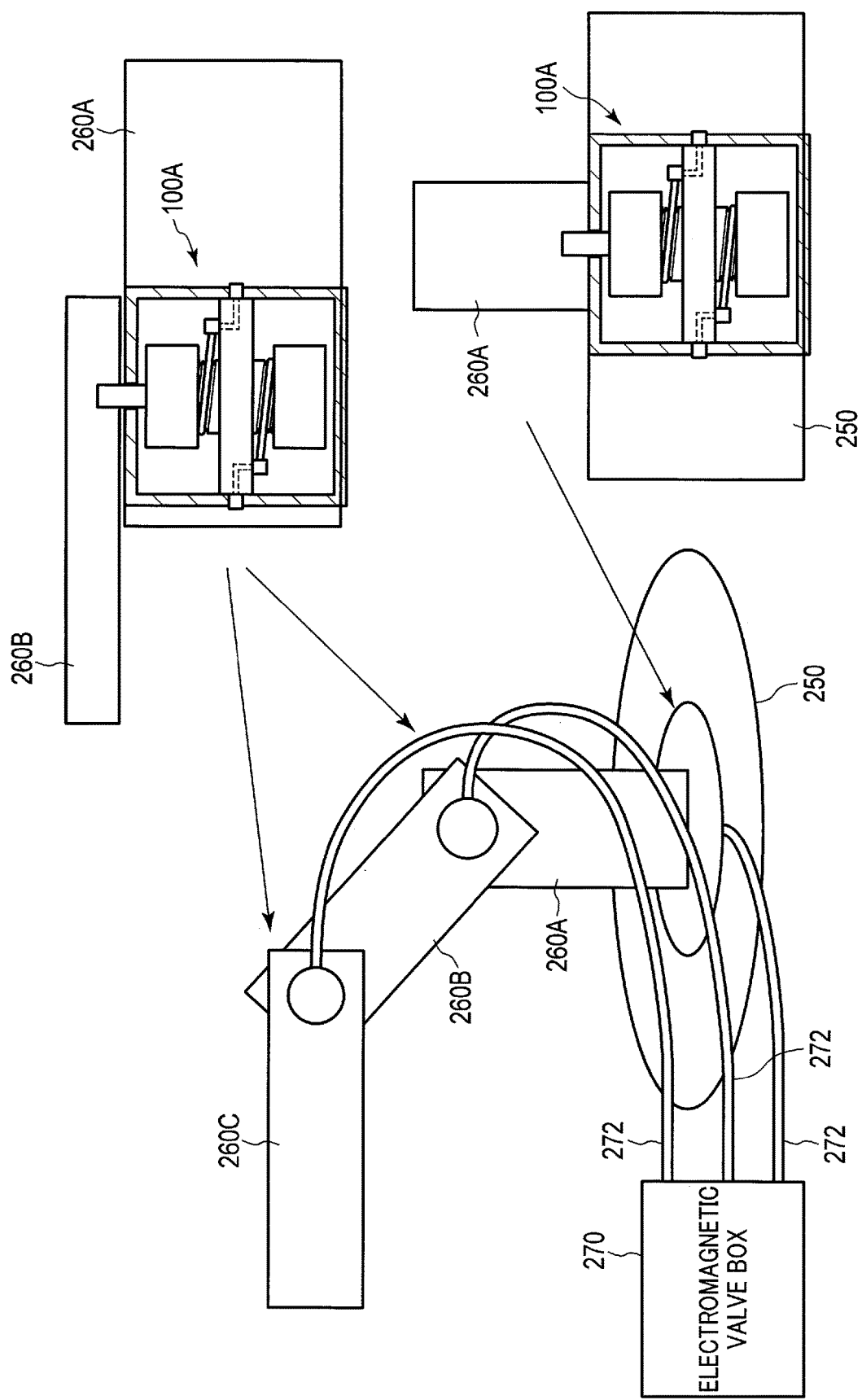
FIG. 9 is a diagram of a triaxial arm robot in which actuators each shown in FIG. 6 are installed.

FIG. 9 is a diagram of a triaxial arm robot in which actuators 100A are installed. In the triaxial arm robot shown in FIG. 9, an actuator 100A is installed in a base 250, and its rotation shaft 142 is fixed to an arm 260A, which is a rotation target. Furthermore, an actuator 100A is installed in the arm 260A, and its rotation shaft 142 is fixed to an arm 260B, which is a rotation target. Similarly, although not shown, an actuator 100A is installed in an arm 260B, and its rotation shaft 142 is fixed to an arm 260C, which is a rotation target.

Since plumbing to the actuators 100A only includes tubes 272 extending from an electromagnetic valve box 270 including the foregoing pressure proportional electromagnetic valves 220A and 220B, the tubes 272 are allowed to be arranged with sensor cables (such as cables for fingertip sensors attached to the arms 260A, 260B, and 260C), so that greater space-saving is achieved compared to a conventional arm robot.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the invention. The accompanying claims and their equivalents are intended to cover such forms or modifications as would fall within the scope and spirit of the inventions.

The invention claimed is:

1. An actuator comprising:
a base to which first and second fluid couplings are fixed;
a rotation member rotatably supported by the base; and
McKibben-type first and second artificial muscles wound around the rotation member, wherein
the first and second artificial muscles are arranged in an antagonistic manner, and one ends of the first and second artificial muscles are fixed to the rotation member, and the other ends of the first and second artificial muscles are respectively connected to the first and second fluid couplings,
the rotation member has a groove configured to receive the first artificial muscle, and
the actuator further comprises:
a cover attached to the rotation member, the cover cooperating with the rotation member to form a space for storing the first artificial muscle; and
a case for storing the cover, a part of the rotation member, and at least a part of the base.

2. The actuator according to claim 1, wherein the groove has a width equal to or greater than a maximum diameter of the first artificial muscle.

3. The actuator according to claim 2, wherein a gap between the cover and the groove is equal to or greater than the maximum diameter of the first artificial muscle.

4. The actuator according to claim 3, wherein a shortest distance from the cover to the rotation member is less than a minimum diameter of the first artificial muscle.

* * * * *